US011205182B2

(12) United States Patent
Cordell et al.

(10) Patent No.: US 11,205,182 B2
(45) Date of Patent: Dec. 21, 2021

(54) RESILIENCY CONFIGURATION FOR A CLOUD-BASED CONTACT CENTER SYSTEM

(71) Applicant: Language Line Services, Inc., Monterey, CA (US)

(72) Inventors: Jeffrey Cordell, Carmel, CA (US); James Boutcher, Carmel, CA (US); Adam Caldwell, Carmel Valley, CA (US); Lindsay D'Penha, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 295 days.

(21) Appl. No.: 16/582,626

(22) Filed: Sep. 25, 2019

(65) Prior Publication Data

US 2021/0090089 A1    Mar. 25, 2021

(51) Int. Cl.
```
G06Q 30/00     (2012.01)
G06F 9/54      (2006.01)
G06F 16/27     (2019.01)
H04L 29/08     (2006.01)
H04L 12/26     (2006.01)
H04L 12/24     (2006.01)
```

(52) U.S. Cl.
CPC ............ *G06Q 30/01* (2013.01); *G06F 9/547* (2013.01); *G06F 16/27* (2019.01); *H04L 43/10* (2013.01); *H04L 67/10* (2013.01); *H04L 67/28* (2013.01); *H04L 67/32* (2013.01); *H04L 41/0803* (2013.01)

(58) Field of Classification Search
CPC .... G06Q 30/02; G06Q 30/00; G06F 3/04842; H04L 43/08; H04L 67/18; H04L 67/2823
See application file for complete search history.

(56) References Cited

U.S. PATENT DOCUMENTS

| | | | |
|---|---|---|---|
| 10,839,432 B1* | 11/2020 | Konig | G06Q 30/0281 |
| 2013/0212484 A1* | 8/2013 | Joshi | G06F 3/04842 |
| | | | 715/740 |
| 2016/0004616 A1* | 1/2016 | Narita | G06F 3/065 |
| | | | 714/6.3 |
| 2019/0028587 A1* | 1/2019 | Unitt | G06Q 30/016 |
| 2019/0273703 A1* | 9/2019 | Chang | G06F 3/0482 |
| 2020/0396121 A1* | 12/2020 | Kumar | G06F 9/5072 |
| 2021/0112144 A1* | 4/2021 | Sarisky | H04L 67/1097 |
| 2021/0182732 A1* | 6/2021 | Peng | G06N 5/04 |

* cited by examiner

*Primary Examiner* — Mahran Y Abu Roumi
(74) *Attorney, Agent, or Firm* — Patent Ingenuity, P.C.; Samuel K. Simpson

(57) ABSTRACT

A computer-implemented contact center platform has a receiver that receives a service request for a service provided by a remotely situated service server. Further, the computer-implemented contact center platform has a transmitter that sends, to a customer relationship management system via a network, a data request for data pertaining to the service request via a first function call through an application programming interface corresponding to a remotely-situated customer relationship management system that stores one or more records pertaining to the service. The computer-implemented contact center platform is distinct from the remotely-situated customer relationship management system. Further, the computer-implemented contact center platform has a memory device have a data cache that stores the data pertaining to the service request.

20 Claims, 6 Drawing Sheets

RESILIENCY CONFIGURATION FOR A CLOUD-BASED CONTACT CENTER SYSTEM

BACKGROUND

1. Field

This disclosure generally relates to the field of contact center systems. More particularly, the disclosure relates to a resiliency configuration for contact center systems.

2. General Background

A contact center is a physical or virtual environment in which a user of a particular service (e.g., language interpretation, banking, insurance, etc.) may contact one of a plurality of representatives of the entity providing the service. The user may want to contact the entity for a variety of reasons (e.g., obtaining a service, customer service issues with a previously obtained service, technical assistance, etc.). Various forms of communication may be used to contact the contact center (e.g., video, audio, etc.).

Although the communication between the user and the contact center appears to the user, on the surface, as a direct communication between the user and a computerized system of the entity, an intricate infrastructure of computing systems is often used to facilitate the interaction between the user and the contact center. For example, the contact center system will often be in communication with a customer relationship management ("CRM") system that is used to access data pertaining to the particular user during the interaction between the user and the contact center representative. Yet, the user is insulated from such behind-the-scenes data flow.

However, a vast array of potential complications (e.g., denial of service attacks, server downtime during software and/or hardware upgrades, power outages, network routing problems, etc.) may arise that lead to unavailability of the CRM system; such lack of access may severely impact the ability of the contact center to provide a service to the user.

Thus, conventional contact center configurations are prone to service interruptions.

SUMMARY

A computer-implemented contact center platform has a receiver that receives a service request for a service provided by a remotely situated service server. Further, the computer-implemented contact center platform has a transmitter that sends, to a CRM system via a network, a data request for data pertaining to the service request via a first function call through an application programming interface ("API") corresponding to a remotely-situated CRM system that stores one or more records pertaining to the service. The computer-implemented contact center platform is distinct from the remotely-situated CRM system.

Further, the computer-implemented contact center platform has a memory device with a data cache that stores the data pertaining to the service request. Additionally, the computer-implemented contact center platform has a processor that, upon the service request being unsuccessful, determines the data pertaining to the service request via a second function call to a simulated API that simulates the remotely-situated CRM system, operates a proxy engine at the computer-implemented contact center platform to access the data pertaining to the service request from a data cache stored on the memory device, and routes the service request to the remotely situated service server to fulfill the service request based upon the data pertaining to the service request.

As another alternative, a computer program may have a computer readable storage device with a computer readable program stored thereon that implements the functionality of the aforementioned platform. As yet another alternative, a process that utilizes a processor may implement the functionality of the aforementioned platform.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
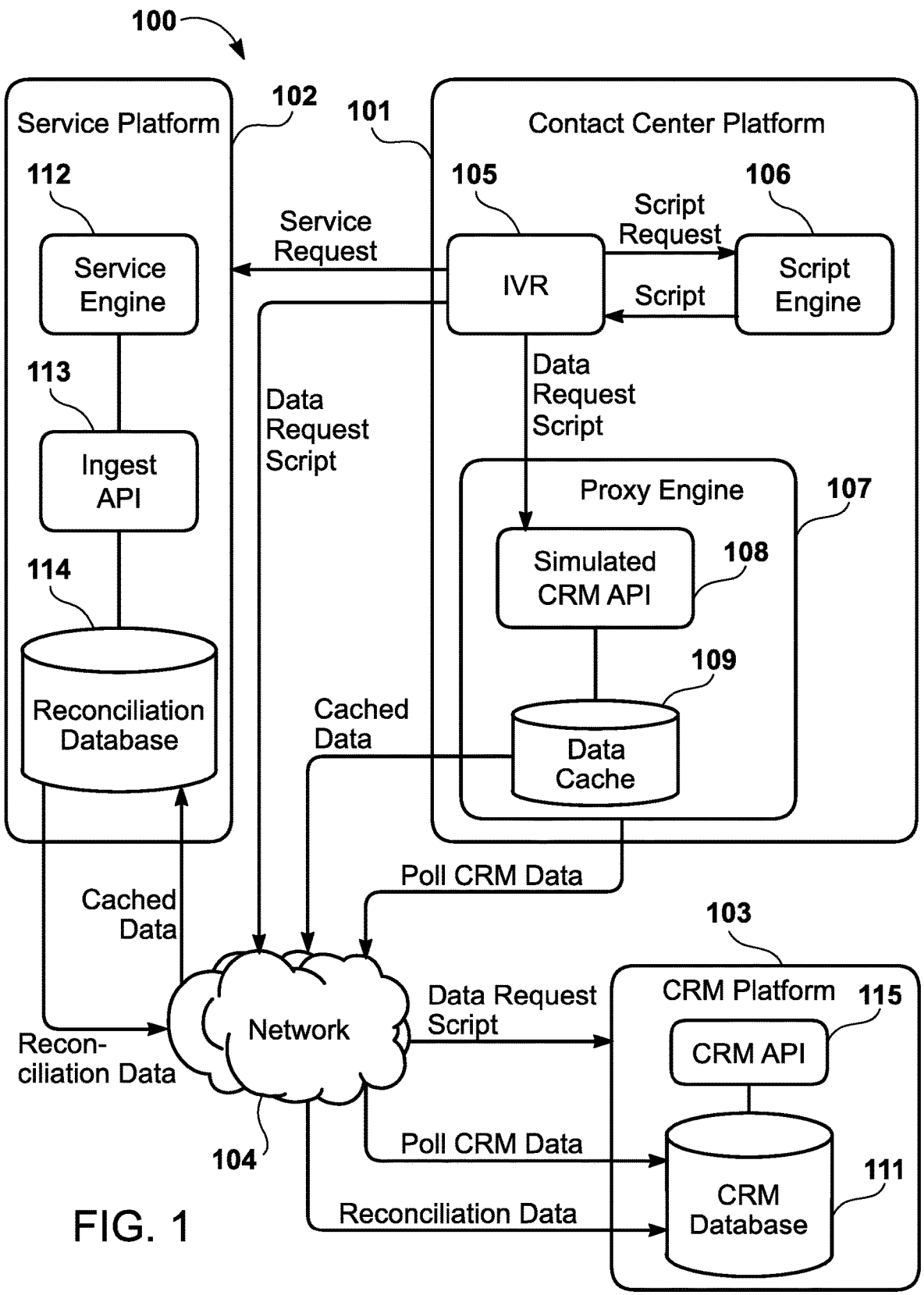
FIG. 1 illustrates a cloud-based resiliency configuration that allows a computer-implemented contact center platform to coordinate services to be provided by a computer-implemented service platform to a plurality of users.

A resiliency configuration for a cloud-based contact center system provides a cloud-based contact center with the ability to seamlessly continue operation of contact center functionality even during a cloud-based performance failure. ("Contact" refers to one or more of a number of possible communication modalities (e.g., voice, video, text, etc.) that may be used to request a service from a server.) For instance, the cloud-based contact center system may receive a request for a service, retrieve data from a CRM system pertaining to the request, and route the request to an optimal entity to provide that service. Should the ability to retrieve such data from the CRM system be disrupted, the cloud-based contact center system may invoke a proxy system (i.e., an intermediary system that previously cloned a sufficient amount of data from the CRM system for the cloud-based center system to continue operations during the CRM system failure) to effectively take on the role of the CRM system. Consequently, during the CRM system failure, the cloud-based contact center system is able to continue operating for an extended period of time (e.g., minutes, hours, days, weeks, etc.) until resolution of the CRM system failure. The user is insulated from such operations so that the user is unaware of whether the could-based contact center system is operating based on the CRM system or according to the proxy system, thereby providing the user with an uninterrupted user experience. Furthermore, upon resolution of the CRM system failure, the cloud-based contact center system performs reconciliation between the proxy system and the CRM system to allow the CRM system to be synchronized with events (e.g., transactions, user profile updates, service request data, etc.) occurring during the interim period when the proxy system was taking on the role of the CRM system. (The CRM operational failure described herein is not limited to a problem with the CRM system itself. The operational failure may arise from external events, such as network malfunctions. Accordingly, the CRM operational failure is intended to encompass a variety of possible malfunctions/errors (e.g., a denial of service attack, the CRM system being offline during an upgrade, a power outage, a network routing malfunction, a firewall error, etc.).)

Accordingly, the resiliency configuration improves the operation of a computing system by allowing the cloud-based contact center system to transition back and forth between the CRM system and the proxy system as necessary to avoid, or minimize, routing and service disruptions to the user; in one embodiment, the resiliency configuration performs such transitions in real-time such that the transitions are not humanly perceptible to a user. In other words, the user will not notice any perceivable delay, or not a delay of a noticeable magnitude, during a transition performed by the cloud-based from reliance on the CRM system to reliance on the proxy system during a CRM system operational failure, or vice-versa for reconciliation.

FIG. 1 illustrates a cloud-based resiliency configuration 100 that allows a computer-implemented contact center platform 101 to coordinate services to be provided by a computer-implemented service platform 102 to a plurality of users. In one embodiment, the contact center platform 101 has an interactive voice response system ("IVR") 105 that accepts voice-based calls from a communication device of a user (e.g., via a predetermined telephone number) on behalf of a service provider. (The voice-base call may be received via a public switched telephone network ("PSTN"), session initiation protocol ("SIP"), or any other communication network and/or protocol). To determine data pertinent to a service request from the user, the IVR 105 may execute one or more scripts generated by a scripting engine 106. For example, the scripting engine 106 may generate one or more scripts to determine the telephone number from which the user is calling based on automatic number identification ("ANI"), determine the telephone number that the user dialed via dialed number identification services ("DNIS"), prompt the user for various data (e.g., account number, spoken language, etc.), and/or perform a variety of other functions to determine data from the user with or without direct input by the user. (Since the configurations provided for herein may be implemented without an IVR (e.g., via direct data input by the user, artificial intelligence ("AI") system, etc.), the IVR 105 is illustrated only as an example. Accordingly, a processor may be used in place of the IVR 105 to communicate with the scripting engine 106 and/or other componentry illustrated in FIG. 1.)

Furthermore, the IVR 105 may obtain data from a CRM platform 103, which may be remotely situated from the contact center platform 101, and is accessible by the IVR 105 of the contact center platform 101 via the network 104. The CRM platform 103 may store one or more data objects in a CRM database 111. In one embodiment, the data objects are configuration objects that may be used to configure a service. For example, the data objects may be determined according to one or more user profiles (e.g., the user, the service agent, etc.), previous transactions, prompts, products, call flows, contacts, etc. For instance, the user profile for a user may include certain user attributes (e.g., language spoken by the user, user demographic information, product preferences, service preferences, agent preferences, etc.), whereas the user profile for the service agent may include certain agent attributes (e.g., skills, experience, qualifications, languages spoken, etc.). In order to route a service request in an optimal manner, the IVR 105 may provide function calls via the network 104 to a CRM API 115 of the CRM platform 103.

After obtaining, in real-time, data objects from the CRM database 111, the IVR 105 automatically determines a service agent, available via the computer-implemented service platform 102, that can fulfill the service requested by the user based upon the data obtained via the CRM database 111. In one embodiment, the service platform 102 has a service engine 112 that routes a communication to a particular service agent (human, automated, or a combination thereof) so that the service agent can provide the service requested by the user. By providing data pertaining to the particular service agent that is necessary (e.g., skill level, qualifications, session duration, etc.), the service platform 102 is able to route the communication to a service agent that is able to fulfill the service request. In essence, the contact center platform 101 manages incoming communications, determines data from those communications, retrieves corresponding data from the CRM database 111, and determines how to route the communication to a service agent that is available via the service platform 102, which may be a remotely situated platform that communicates with the contact center platform 101 via the network 104. (The service platform 102 may provide one of a number of services (e.g., language interpretation, banking, insurance, etc.), which involve routing a user communication to a service agent (automated, human, or a combination thereof) that fulfills the service request.)

In the event of a CRM operational failure, the contact center platform 101 has stored thereon, or is in operable communication with, a proxy engine 107, which may be implemented by a specialized processor. In preparation for such a possible CRM operational failure in the communication between the CRM platform 103 and the contact center platform 101, the proxy engine 107 periodically polls the CRM database 111 (e.g., via the CRM API 115) to obtain data objects from the CRM database 111, and store them within a data cache 109 (e.g., on a memory device at the proxy engine 107) for subsequent retrieval during a CRM operational failure. As a result of storing data in the data cache 109, when a CRM operational failure occurs, the proxy engine 107 is able to quickly obtain necessary data objects even though the CRM platform 103 may be inaccessible, thereby allowing the proxy engine 107 to take on the role of the CRM platform 103 in a seamless manner in real-time with no, or minimal, interruption to the user experience. Therefore, the proxy engine 107 improves the functioning of the contact center platform 101 by providing seamless, real-time access to services via the service platform 102 in an insular manner during a CRM operational failure.

Furthermore, in one embodiment, the IVR 105 may generate a script via the scripting engine 106 to make function calls to the proxy engine 107 via a CRM simulated API 108. In other words, the IVR 105 may continue to use the same function calls that it would normally use to invoke the CRM platform 103, even when making those function calls to the proxy engine 107 in place of the CRM platform 103 during a CRM operational failure. Accordingly, the IVR 105 may efficiently transition from making function calls to the CRM platform 103 to making functional calls to the proxy engine 107 during a CRM operational failure, thereby further reducing computational overload during the transition. Moreover, in another embodiment, the simulated CRM API 108 may only include a subset of the function calls provide by the CRM API 115 to reflect only necessary functionality during the CRM operational failure.

In yet another embodiment, the service platform 102 may store a reconciliation database 114 into which the proxy engine 107 may send data from the data cache 109. Rather than being a fast-access memory device, as may be used for the data cache 109, the reconciliation database 114 may be a slower-access data storage device (e.g., disk, hard drive, tape, etc.) that is used to more permanently store data than the data cache 109. For example, the proxy engine 107 may have to swap less recently used data out of the data cache 109 to make room for newer data (e.g., newer service transaction records in place of older service transaction records). Furthermore, after the CRM operational failure has been resolved, the proxy engine 107 may perform a reconciliation process to synchronize data between the data stored in the reconciliation database 114 and the CRM database 111 so that the CRM database 111 has the most recent up-to-date data objects that it did not have access to during the CRM operational failure. (Although the reconciliation database 114 is described and illustrated as being stored at the service platform 102, it may, alternatively, be stored at a distinct server, such as the contact center platform 101 or a different server.)

In another embodiment, the proxy engine 107 performs a polling process to poll data objects from the CRM database 111 according to a probabilistic model. For example, each data object stored in the CRM database 111 may have a corresponding time indicium (e.g., tag, field, etc.) that indicates the last modified time of the particular data object. On a per object basis, the proxy engine 107 may poll (i.e., query) the CRM database 111 for changes to each object. To improve computational processing time (i.e., by reducing the amount of queries submitted to the CRM database 111 to avoid overloading the CRM database 111 with queries), the proxy engine 107 may determine a likelihood that each data object changed since the last polling request (e.g., periodically each minute), and only poll the CRM database 111 for those data objects that exceed a predetermined likelihood threshold. As an example, a data object that changed five minutes ago may be part of an ongoing transaction, thereby being more likely to be changed than a data object that changed one day ago. Accordingly, the proxy engine 107 may only poll the CRM database 111 for those data objects that exceed the predetermined likelihood threshold, and not poll the remaining data objects that do not exceed the predetermined likelihood threshold. As a result, the proxy engine 107 may operate according to a data set that has a probability of matching the data set of the CRM database 111 with a certain degree of confidence, but the data set stored in the data cache 109 may not, in reality, exactly match the data set of the CRM database 111. By utilizing a probabilistic data set, as opposed to the actual data set, the proxy engine 107 is able to improve computing performance of the contact center platform 101, maintaining operational functionality in a real-time manner for the user, who is insulated from the CRM operational failure. Furthermore, any discrepancies that may result from the use of the foregoing data set may be resolved during the reconciliation process.

In yet another embodiment, an ingest API 113, optionally stored at the service platform 102, may be used to ingest the data received from the proxy engine 107. For example, the proxy engine 107 may make function calls to the ingest API 113 to store data from the data cache 109 directly in the reconciliation database 114. Furthermore, the reconciliation process may be performed directly between the reconciliation database 114 and the CRM database 111 based on the ingest API 113. For example, the proxy engine 107 may make a function call to the ingest API 113, or another API at the service platform 102, to synchronize data between the reconciliation database 114 and the CRM database 111 in predetermined time increments. Alternatively, the reconciliation process may be performed without an API. As yet another alternative, the proxy engine 107 may obtain data from the reconciliation database 114 and provide that data to the CRM database 111.

Figure 2:
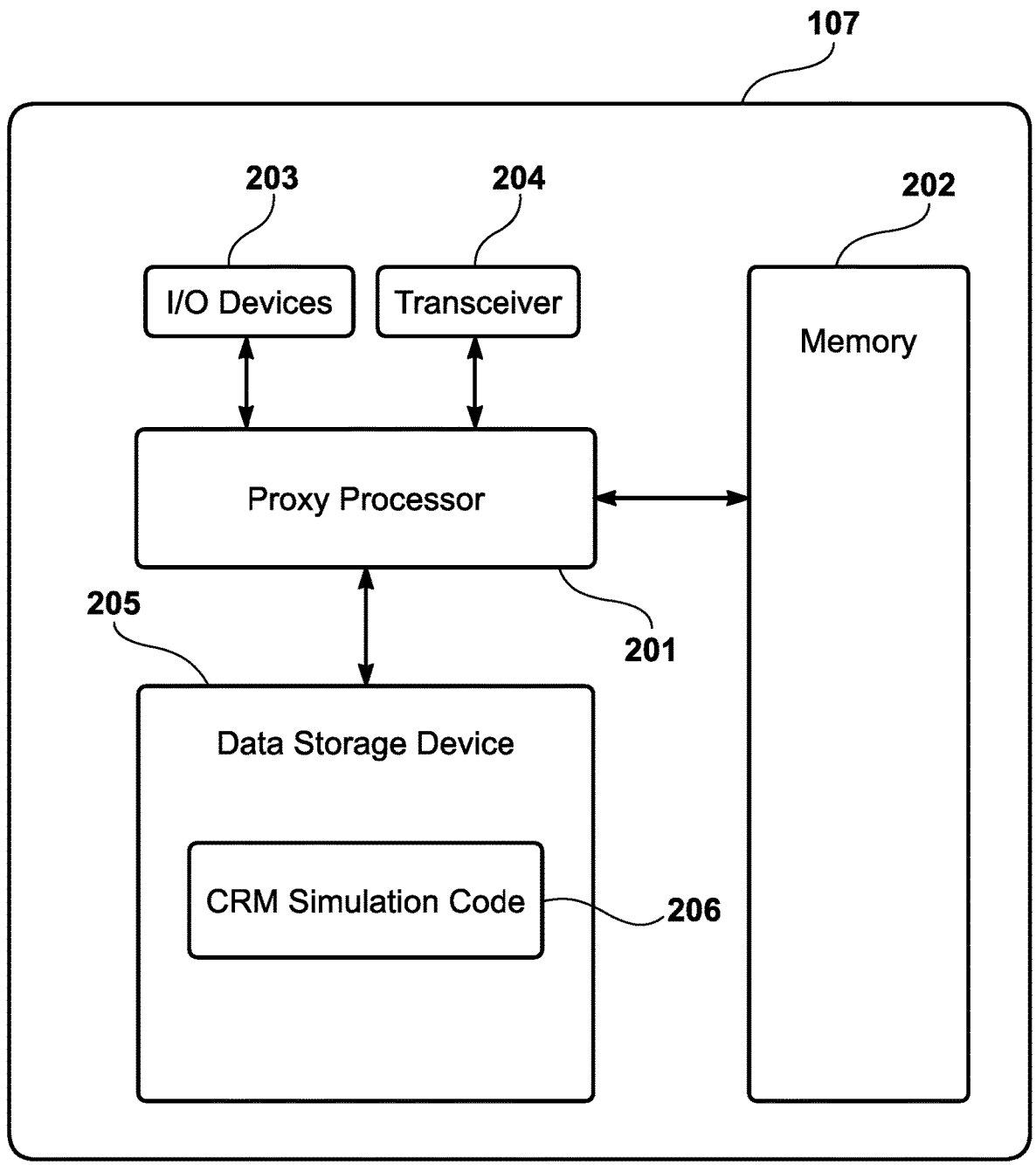
FIG. 2 illustrates a configuration of the internal components of the proxy engine illustrated in FIG. 1.

FIG. 2 illustrates a configuration of the internal components of the proxy engine 107 illustrated in FIG. 1. The proxy engine 107 has a proxy processor 201, which may be a specialized processor for performing real-time simulation of the CRM system 103 illustrated in FIG. 1. Furthermore, the proxy processor 201 may be in operable communication with a memory device 202 that is specialized for implementing the data cache 109 for real-time access during simulation of the proxy engine 107 of the CRM system 103. The proxy engine 107 may also have a transceiver 204, which it may use to send and receive communications over the network 104 with the CRM platform 103 and/or the service platform 102. (Alternatively, a separate transmitter and receiver may be used in place of the transceiver 204.)

Moreover, the proxy engine 107 may have a data storage device 205 that stores CRM simulation code 206. In particular, the proxy processor 201 may execute the CRM simulation code 206 to simulate the CRM database 111 via the data cache 109 and/or the CRM API 115 via the simulated CRM API 108.

Finally, the proxy engine 107 may have one or more input/output ("I/O") devices (e.g., touch-screen interface, keyboard, microphone, etc.) that may be used to receive inputs and emit outputs.

Figure 3:
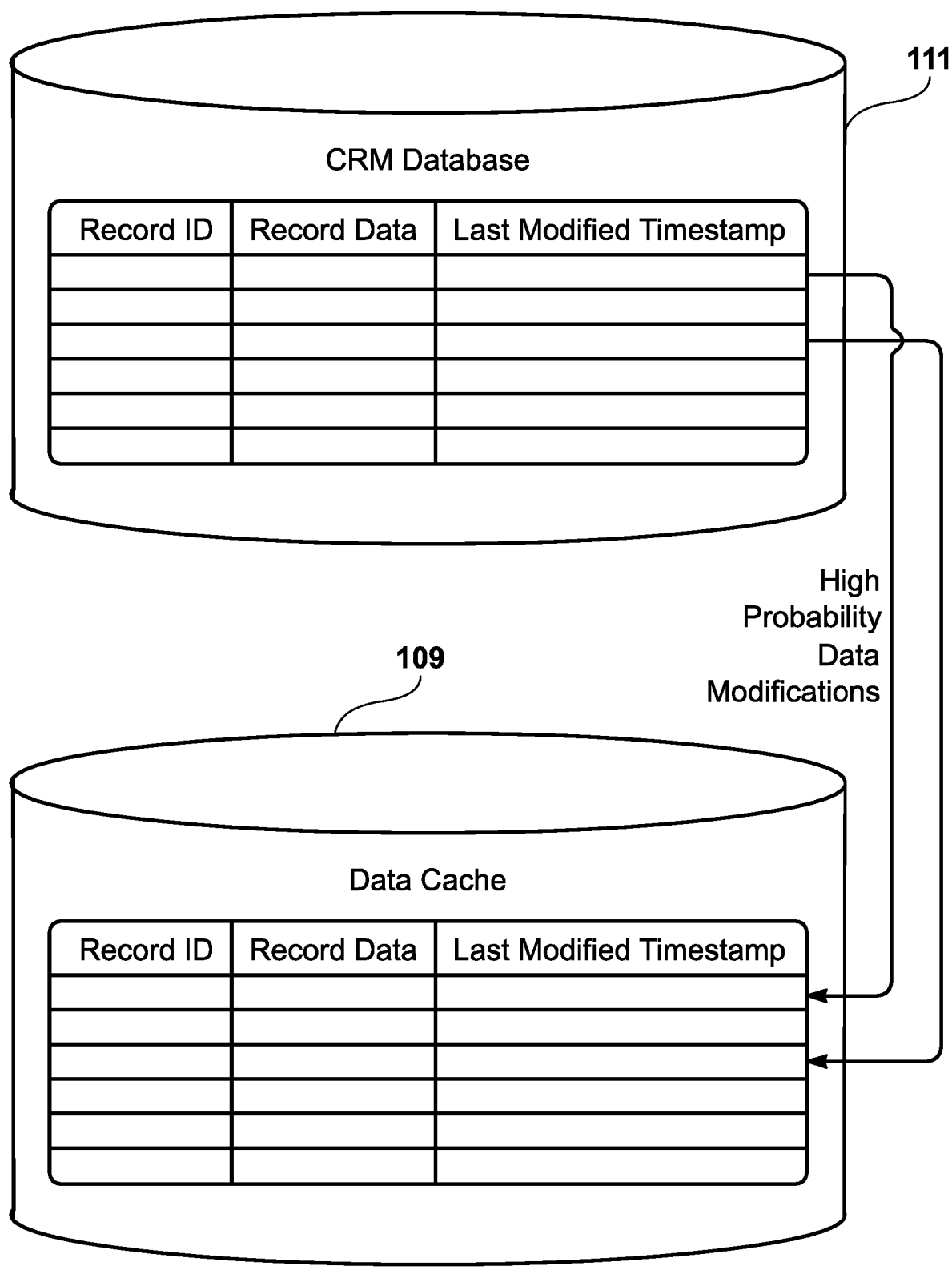
FIG. 3 illustrates an example of the probabilistic model being implemented in the transfer of data from the CRM database to the data cache.

Further, FIG. 3 illustrates an example of the probabilistic model being implemented in the transfer of data from the CRM database 111 to the data cache 109. As an example, the CRM database 111 may store a plurality of data objects (e.g., a data object may have a corresponding row in a database table), each having a plurality of data fields (e.g., record identifier, record data, last modified date, etc.). Based on one or more of the fields, such as the last modified time, as filtering criteria, the proxy engine 107 may analyze the probability of a particular data object being modified during a CRM system failure. For instance, depending upon a particular context, the proxy engine 107 may determine that data objects modified within the last hour meet the probability threshold, whereas data objects modified within the last day do not meet that probability threshold. Accordingly, the proxy engine 107 may poll only those objects meeting that probability threshold for data updates, thereby improving computational efficiency by reducing the computational resources necessary for polling all of the data objects.

Figure 4A:
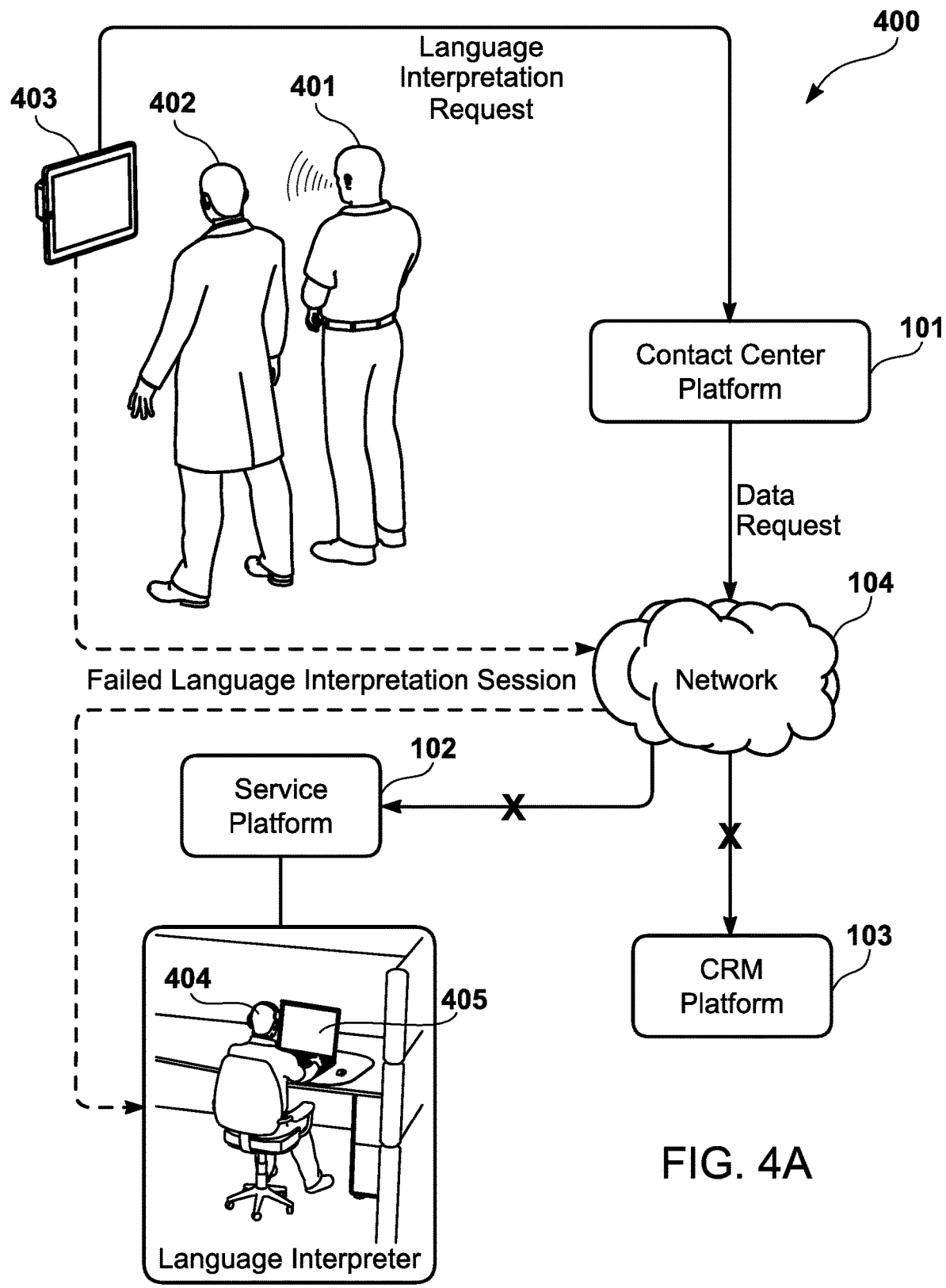
FIG. 4A illustrates one example of the cloud-based contact center system being implemented in a language interpretation environment.
Figure 4B:
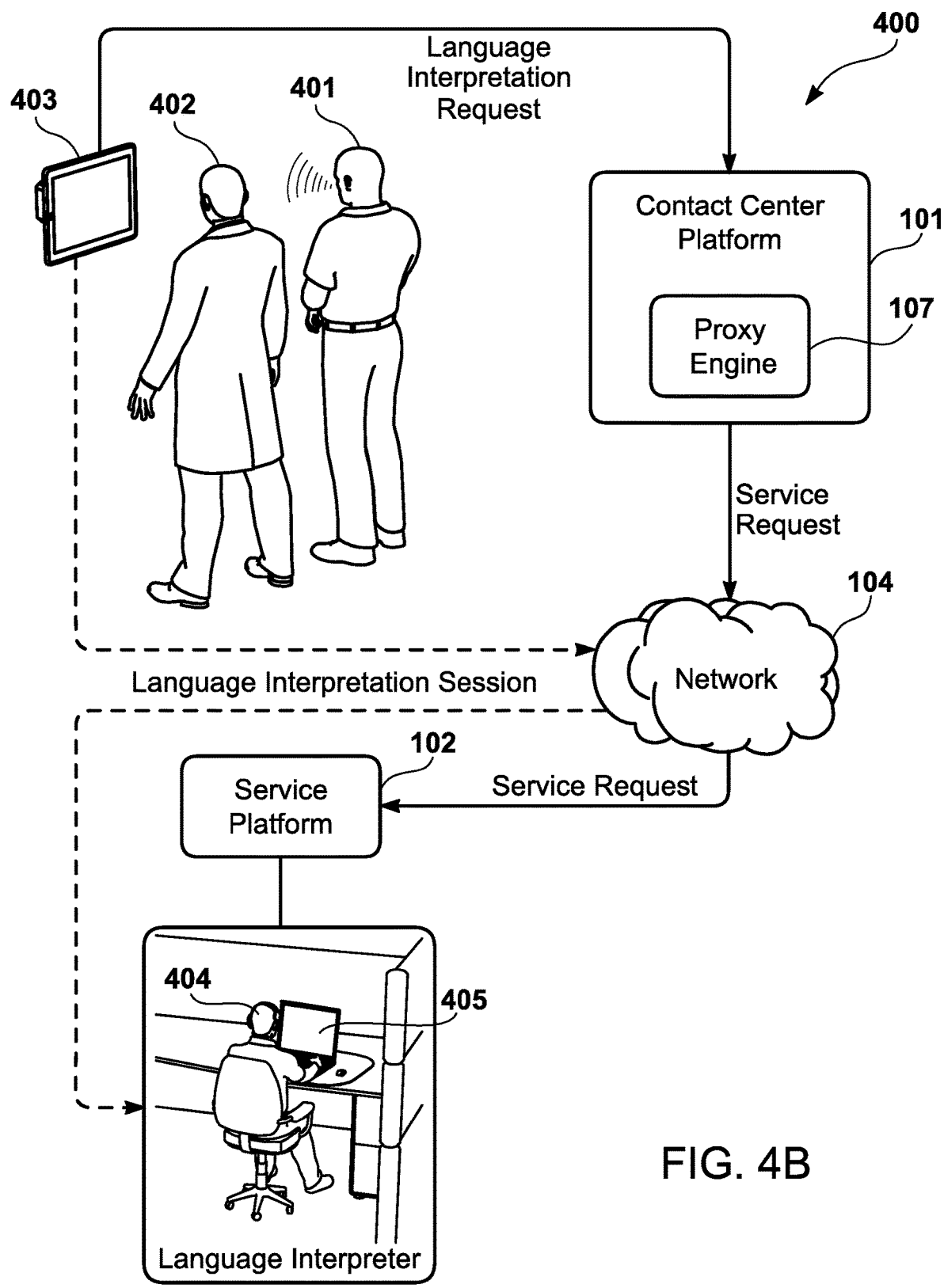
FIG. 4B illustrates the contact center platform determining, in real-time, the CRM system failure, and transitioning the service request to the proxy engine to allow the service request to continue onward to the service platform.

The resiliency configuration for the cloud-based contact center system 100 of FIG. 1 may be implemented in a variety of environments. As one example, the cloud-based contact center system 100 may be implemented in a language interpretation environment 400, as illustrated in FIG. 4A. For example, a limited English proficiency ("LEP") patient 401, who speaks Spanish, and a doctor 402, who speaks English, may be present be in a hospital, and in need of a language interpreter. The patient 401 and the doctor 402 may utilize a mobile computing device 403 (e.g., smartphone, tablet device, smartwatch, etc.) to call a predetermined telephone number to request a voice-based language interpretation session. (Other forms of communication modalities and protocols may be used instead.) The predetermined telephone number may be associated with the contact center platform 101 illustrated in FIG. 1. Using the IVR 105 to execute a script via the scripting engine 106, the contact center platform 101 may attempt to retrieve pertinent data from the CRM platform 103 via the network 104. However, prior to, or during, the request for the language interpretation service, a CRM system failure may have occurred that disables the CRM platform 103 from having the communication ability to communicate with the contact center platform 101. As a result, the contact center platform 101 is unable to route the service request to the service platform 102 via the network 104, since the contact center platform 101 would not have pertinent data to determine an optimal routing for the communication. In real-time, as illustrated in FIG. 4B, the contact center platform 101 determines the CRM system failure and transitions the service request to the proxy engine 107 to allow the service request to continue onward to the service platform 102. As a result, the service platform 102 selects an available language interpreter 404 that is accessible via a computing device 405 (e.g., personal computer, laptop computer, mobile computing device, etc.). (The language interpretation environment 400 is provided only as an example, since other language interpretation environments or other types of environments (e.g., banking, insurance, etc.) may use the resiliency configuration for the cloud-based contact center system 100.)

Figure 5:
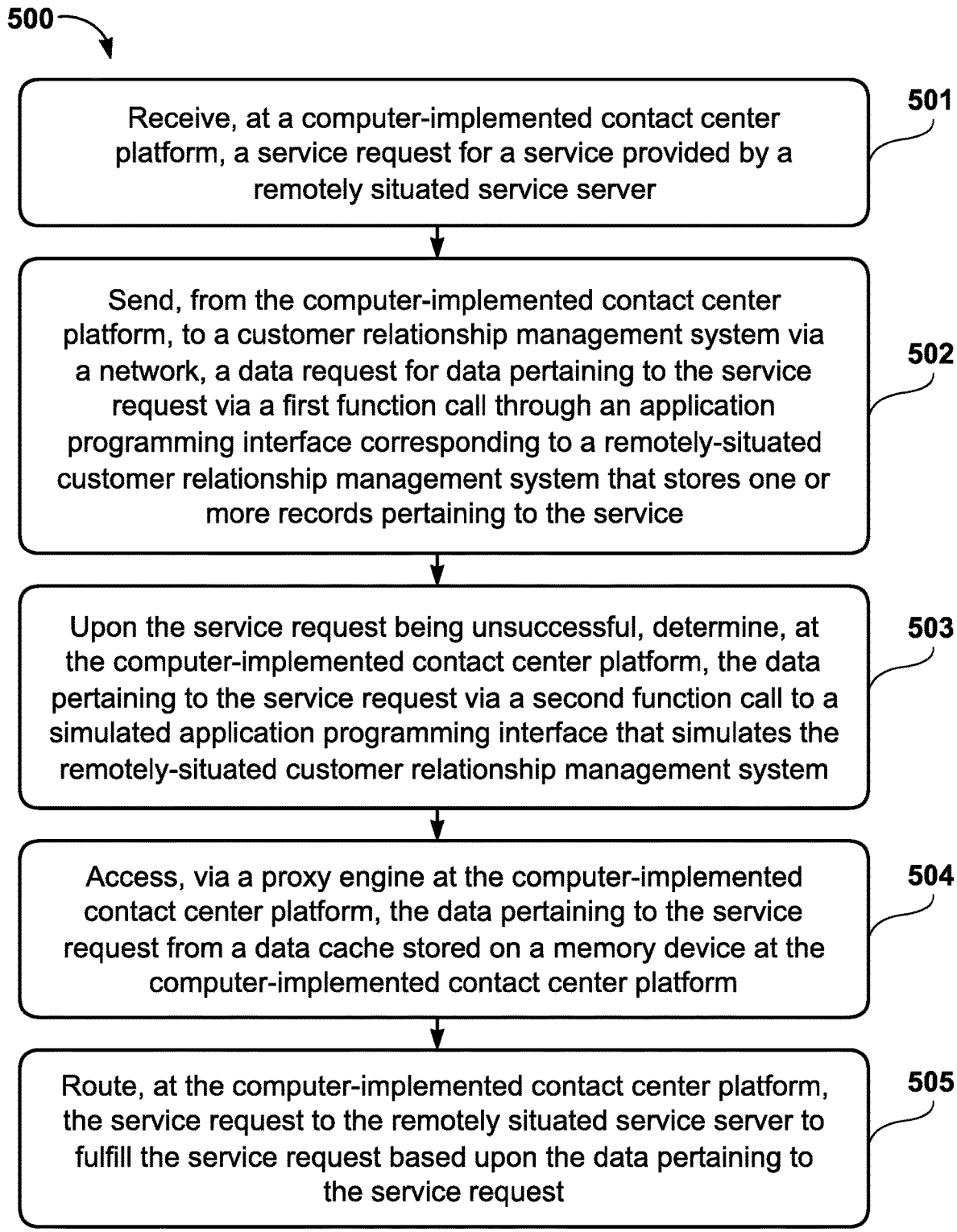
FIG. 5 illustrates a process that may be utilized by the proxy processor illustrated in FIG. 2 to implement the proxy engine illustrated in FIG. 1.

FIG. 5 illustrates a process 500 that may be utilized by the proxy processor 201 illustrated in FIG. 2 to implement the proxy engine 107 illustrated in FIG. 1. At a process block 501, the process 500 receives, at the computer-implemented contact center platform 101, a service request for a service provided by a remotely situated service server 103. The remotely-situated server may be distinct from the contact computer-implemented center platform 101. Further, at a process block 502, the process 500 sends, from the computer-implemented contact center platform 101 to the CRM platform 103 via the network 104, a data request for data pertaining to the service request via a first function call through the API corresponding to the remotely-situated CRM platform 103 that stores one or more records pertaining to the service. The computer-implemented contact center platform 101 is distinct from the remotely-situated CRM system 103. Furthermore, at a process block 503, the process 500 upon the service request being unsuccessful, determines, at the computer-implemented contact center platform 101, the data pertaining to the service request via a second function call to the simulated CRM API 108 that simulates the remotely-situated CRM platform 103. Additionally, at a process block 504, the process 500 accesses, via the proxy engine 107 at the computer-implemented contact center platform 101, the data pertaining to the service request from the data cache 109 stored on the memory device 202 at the computer-implemented contact center platform 101. Finally, at a process block 505, the process routes, at the computer-implemented contact center platform 101, the service request to the remotely situated service server 104 to fulfill the service request based upon the data pertaining to the service request.

Although the configurations provided for herein are described with respect to a CRM performance failure, the configurations may, alternatively, be used for performance failures with systems other than the CRM platform 103, such as systems that provide backend support for the contact center platform 101.

Furthermore, although only one network 104 is illustrated, multiple networks may be utilized within the cloud-based resiliency configuration 100. In other words, the proxy engine 107 may perform resiliency in single-cloud or multi-cloud environments.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program when executed on a computer causes the computer to:

periodically poll, with a proxy engine at a computer-implemented contact center platform, a remotely-situated customer relationship management system via a network prior to an operational failure of the remotely-situated customer relationship management system to obtain one or more data objects from a database associated with the remotely-situated customer relationship management system;

store the one or more data objects in a data cache of a memory device at the computer-implemented contact center platform for subsequent retrieval during the operational failure of the remotely-situated customer relationship management system;

receive, at a computer-implemented contact center platform, a service request for a service provided by a remotely situated service server, the remotely-situated server being distinct from the contact computer-implemented center platform;

send, from the computer-implemented contact center platform to the remotely-situated customer relationship management system via a network, a data request for data pertaining to the service request via a first function call through an application programming interface corresponding to the remotely-situated customer relationship management system that stores one or more records pertaining to the service, the computer-implemented contact center platform being distinct from the remotely-situated customer relationship management system;

upon the service request being unsuccessful based on the operational failure of the remotely-situated customer relationship management system, determine, at the computer-implemented contact center platform, the data pertaining to the service request via a second function call to a simulated application programming interface that simulates the remotely-situated customer relationship management system;

access, via the proxy engine at the computer-implemented contact center platform, the one or more data objects corresponding to the data pertaining to the service request from the data cache; and route, at the computer-implemented contact center platform, the service request to the remotely situated service server to fulfill the service request based upon the one or more data objects.

2. The computer program product of claim 1, wherein the computer is further caused to determine that the service request is unsuccessful based upon the computer-implemented contact center platform experiencing a wait time that exceeds a predetermined timeout threshold.

3. The computer program product of claim 1, wherein the computer is further caused to determine that the service request is unsuccessful based upon the computer-implemented contact center platform determining that a performance failure has occurred at the remotely-situated customer relationship management system, the performance failure being selected from the group consisting of: a denial of service attack, the remotely-situated customer relationship management system being offline during an upgrade, a power outage, or a network routing malfunction.

4. The computer program product of claim 1, wherein the computer is further caused to previously generate, at the proxy engine, the data pertaining to the service request for storage in the data cache during successful communication between the computer-implemented contact center platform and the remotely-situated customer relationship management system, the proxy engine previously polling the data pertaining to the service request from a database stored at the remotely-situated customer relationship management system.

5. The computer program product of claim 4, wherein the computer is further caused to previously perform the polling, at the proxy engine, based upon a probabilistic model of the data pertaining to the service request exceeding a likelihood threshold of being updated in a data update.

6. The computer program product of claim 5, wherein the computer is further caused to send, from the proxy engine to the remotely situated service server, the data pertaining to the service request upon the likelihood threshold being exceeded for storage in a reconciliation database at the remotely situated service server.

7. The computer program product of claim 1, wherein the computer is further caused to send, from the proxy engine to the remotely situated service server, data generated pertaining to at least partial fulfillment of the service request during a performance failure that occurred at the remotely-situated customer relationship management system, the data generated pertaining to at least partial fulfillment of the service request being stored in a reconciliation database at the remotely situated service server.

8. The computer program product of claim 7, wherein the computer is further caused, upon removal of the performance failure, to perform synchronization between the reconciliation database and the remotely-situated customer relationship management system.

9. The computer program product of claim 1, wherein the computer is further caused to receive the service request via an interactive response system at the computer-implemented contact center platform.

10. The computer program product of claim 1, wherein the computer is further caused to monitor one or more events processed via the simulated application programming interface to analyze performance of the proxy engine.

11. A method comprising:
periodically polling, with a proxy engine at a computer-implemented contact center platform, a remotely-situated customer relationship management system via a network prior to an operational failure of the remotely-situated customer relationship management system to obtain one or more data objects from a database associated with the remotely-situated customer relationship management system;
storing the one or more data objects in a data cache of a memory device at the computer-implemented contact center platform for subsequent retrieval during the operational failure of the remotely-situated customer relationship management system;
receiving, at a computer-implemented contact center platform, a service request for a service provided by a remotely situated service server, the remotely-situated server being distinct from the contact computer-implemented center platform;
sending, from the computer-implemented contact center platform to the remotely-situated customer relationship management system via a network, a data request for data pertaining to the service request via a first function call through an application programming interface corresponding to the remotely-situated customer relationship management system that stores one or more records pertaining to the service, the computer-implemented contact center platform being distinct from the remotely-situated customer relationship management system;
upon the service request being unsuccessful based on the operational failure of the remotely-situated customer relationship management system, determining, at the computer-implemented contact center platform, the data pertaining to the service request via a second function call to a simulated application programming interface that simulates the remotely-situated customer relationship management system;
accessing, via the proxy engine at the computer-implemented contact center platform, the one or more data objects corresponding to the data pertaining to the service request from the data cache; and
routing, at the computer-implemented contact center platform, the service request to the remotely situated service server to fulfill the service request based upon the one or more data objects.

12. The method of claim 11, further comprising determining that the service request is unsuccessful based upon the computer-implemented contact center platform experiencing a wait time that exceeds a predetermined timeout threshold.

13. The method of claim 11, further comprising determining that the service request is unsuccessful based upon the computer-implemented contact center platform determining that a performance failure has occurred at the remotely-situated customer relationship management system, the performance failure being selected from the group consisting of: a denial of service attack, the remotely-situated customer relationship management system being offline during an upgrade, a power outage, or a network routing malfunction.

14. The method of claim 11, further comprising previously generating, at the proxy engine, the data pertaining to the service request for storage in the data cache during successful communication between the computer-implemented contact center platform and the remotely-situated customer relationship management system, the proxy engine previously polling the data pertaining to the service request from a database stored at the remotely-situated customer relationship management system.

15. The method of claim 14, further comprising previously performing the polling, at the proxy engine, based upon a probabilistic model of the data pertaining to the service request exceeding a likelihood threshold of being updated in a data update.

16. The method of claim 15, further comprising sending, from the proxy engine to the remotely situated service server, the data pertaining to the service request upon the likelihood threshold being exceeded for storage in a reconciliation database at the remotely situated service server.

17. The method of claim 1, further comprising sending, from the proxy engine to the remotely situated service server, data generated pertaining to at least partial fulfillment of the service request during a performance failure that occurred at the remotely-situated customer relationship management system, the data generated pertaining to at least partial fulfillment of the service request being stored in a reconciliation database at the remotely situated service server.

18. The method of claim 17, upon removal of the performance failure, to performing synchronization between the reconciliation database and the remotely-situated customer relationship management system.

19. The method of claim 11, further comprising receiving the service request via an interactive response system at the computer-implemented contact center platform.

20. A computer-implemented contact center platform comprising:
- a receiver that receives a service request for a service provided by a remotely situated service server;
- a transmitter that sends, to a remotely-situated customer relationship management system via a network, a data request for data pertaining to the service request via a first function call through an application programming interface corresponding to the remotely-situated customer relationship management system that stores one or more records pertaining to the service, the computer-implemented contact center platform being distinct from the remotely-situated customer relationship management system;
- a memory device have a data cache that stores one or more data objects from a database associated with the remotely-situated customer relationship management system for subsequent retrieval during the operational failure of the remotely-situated customer relationship management system, the one or data objects corresponding to the data pertaining to the service request; and
- a processor that, prior to the operational failure of the remotely-situated customer relationship management system (i) periodically polls, with a proxy engine at the computer-implemented contact center platform, the remotely-situated customer relationship management system via the network to obtain the one or more data objects from the database and (ii) stores the one or more data objects in a data cache of a memory device at the computer-implemented contact center platform for subsequent retrieval during the operational failure, and upon the service request being unsuccessful based on the operational failure, (i) determines the data pertaining to the service request via a second function call to a simulated application programming interface that simulates the remotely-situated customer relationship management system, (ii) operates proxy engine at the computer-implemented contact center platform to access the one or more data objects corresponding to the data pertaining to the service request from the data cache, and (iii) routes the service request to the remotely situated service server to fulfill the service request based upon the data pertaining to the service request.

* * * * *